(12) United States Patent
Kokosalakis et al.

(10) Patent No.: US 7,835,226 B2
(45) Date of Patent: Nov. 16, 2010

(54) COMMUNICATIONS AND POWER HARVESTING SYSTEM FOR IN-PIPE WIRELESS SENSOR NETWORKS

(75) Inventors: George Kokosalakis, Astoria, NY (US); Alexander M. Gorlov, Brookline, MA (US); Eduardo Kausel, Wellesley, MA (US); Andrew J. Whittle, Boxborough, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 954 days.

(21) Appl. No.: 11/643,750

(22) Filed: Dec. 20, 2006

(65) Prior Publication Data

US 2007/0209865 A1 Sep. 13, 2007

Related U.S. Application Data

(60) Provisional application No. 60/752,322, filed on Dec. 20, 2005, provisional application No. 60/752,324, filed on Dec. 20, 2005.

(51) Int. Cl.
*H04H 9/00* (2006.01)
(52) U.S. Cl. .................. 367/83; 367/81; 340/854.4; 340/856.4
(58) Field of Classification Search ............. 340/856.4, 340/854.4; 367/81, 83; 166/84.4, 77.2, 250.01
See application file for complete search history.

(56) References Cited

U.S. PATENT DOCUMENTS

| | | | | |
|---|---|---|---|---|
| 3,789,355 A | * | 1/1974 | Patton | ......................... 367/137 |
| 3,863,203 A | * | 1/1975 | Patton et al. | ................... 367/85 |
| 4,337,667 A | | 7/1982 | Takada | |
| 4,562,559 A | * | 12/1985 | Sharp et al. | ................... 367/82 |

(Continued)

FOREIGN PATENT DOCUMENTS

GB  2 377 131 A  12/2002

OTHER PUBLICATIONS

Li, Yinghui, et al., "Experimental Study on Ultrasonic Signal Transmission Within the Water-Filled Pipes," Mechantronics and Machine Vision in Practice, 1997, Proceedings., Fourth Annual Conference on Toowoomba, QLD. Australia Sep. 23-25, 197, Los Alamitos, CA, USA, IEEE Comput. Soc. US, Sep. 23, 1997, pp. 93-98, XP010248260, ISBN: 0-8186-8025-3.

*Primary Examiner*—Timothy Edwards, Jr.
(74) *Attorney, Agent, or Firm*—Hamilton, Brook, Smith & Reynolds, P.C.

(57) ABSTRACT

A system or corresponding method provides for communicating data in confined waveguides containing a fluid. The system includes processing and transmitter/receiver operations at nodes in or alone the confined waveguides and transducers to produce a propagation signal that transmits modulated data via the fluid in the confined waveguide. Applications include sensing information about the fluid, such as the pressure, pH, or other parameter(s), and transmitting that data via the fluid in the confined waveguide. For example, the system may be distributed about an oil pipeline or network of oil pipelines. Nodes in the system may include turbines that generate power for use by the nodes at levels sufficient to support the node for its activities. Signal processing and multiple transducers at each node may be employed to extend distances up to kilometers between nodes for low-cost operation of the system.

32 Claims, 10 Drawing Sheets

U.S. PATENT DOCUMENTS

| | | | |
|---|---|---|---|
| 5,319,610 A * | 6/1994 | Airhart ..................... 367/82 |
| 5,371,686 A | 12/1994 | Nabity et al. |
| 5,416,724 A | 5/1995 | Savic |
| 5,592,438 A | 1/1997 | Rorden et al. |
| 5,623,421 A | 4/1997 | Savic |
| 5,708,195 A | 1/1998 | Kurisu et al. |
| 5,719,556 A | 2/1998 | Albin et al. |
| 5,757,664 A | 5/1998 | Rogers et al. |
| 5,818,735 A | 10/1998 | Tigwell et al. |
| 6,082,193 A | 7/2000 | Paulson |
| 6,389,881 B1 | 5/2002 | Yang et al. |
| 7,207,396 B2 * | 4/2007 | Hall et al. ..................... 175/40 |
| 2002/0189362 A1 | 12/2002 | Havlena |
| 2003/0117896 A1 | 6/2003 | Sakuma et al. |
| 2003/0138053 A1 | 7/2003 | Candy et al. |
| 2004/0105342 A1 * | 6/2004 | Gardner et al. ................ 367/25 |
| 2005/0007877 A1 | 1/2005 | Martin et al. |
| 2007/0189119 A1 * | 8/2007 | Klotz et al. ................... 367/83 |

* cited by examiner

COMMUNICATIONS AND POWER HARVESTING SYSTEM FOR IN-PIPE WIRELESS SENSOR NETWORKS

RELATED APPLICATIONS

This application claims the benefit of U.S. Provisional Application No. 60/752,322, filed on Dec. 20, 2005, entitled "Power Harvesting System For In-Pipe Wireless Sensor Networks" and claims the benefit of U.S. Provisional Application No. 60/752,324, filed on Dec. 20, 2005, entitled "Acoustic Data Communication for In-Pipe Wireless Sensor Networks." The entire teachings of the above applications are incorporated herein by reference.

BACKGROUND OF THE INVENTION

Over the past decades, underwater communication have evolved into a very active research area since it facilitates the needs of many military, or more recently, commercial operations. Applications that may require underwater communications include communications with submarines, communication between divers, command of autonomous underwater vehicles (AUV), animal tracking, sea bed exploration, pollution monitoring, remote control of off-shore equipment, data collection from deep sea sensors, and so on. These applications of underwater communication rely mostly on the transmission of acoustic waves. Several military, commercial and research implementations of acoustic communication systems exist that are capable of achieving high data rates at considerable range.

FIG. 1 illustrates an example of a deep sea underwater acoustic communications system 100. The acoustic communications system 100 is maintained below water level 102 and includes a typical transmitter 104 and receiver 106 pair. The transmitter 104 may include a transmitting communications protocol 108, which is responsible for enabling data transfers and for defining syntax, semantics, and synchronization of the communications. The transmitter 104 may also include an error correction algorithm unit 110. Many prior art error correction algorithm units employ frequency shift keyed (FSK), phase shift keying (PSK), and quadrature amplitude modulation (QAM) schemes. These modulation schemes compensate digitally encoded data for distortion and noise introduced to data during transmission. Upon modulation from the error correction algorithm unit 110, the digital data is then converted to an analog signal via a digital to analog converter 112. The analog signal is then amplified by a power amplifier 114 A projector (i.e., transducer) 116 is typically used to transmit the acoustic data 118 underwater.

The receiver 106 includes a hydrophone (i.e., transducer) 120 for detecting the acoustic data 118 and a preamplifier 122 for amplifying received analog signal. An analog-to-digital converter 124 is used to convert the received analog signal to a digital signal. A receiving error correction algorithms unit 126 is used to demodulate the received signal using the inverse of methodologies similar to that of the transmitting error correction algorithm unit 110. Finally, the receiver 106 may also include a receiving communications protocol 128 similar to that of the transmitting communications protocol 108.

SUMMARY OF THE INVENTION

Research and development of underwater acoustic communications has almost exclusively focused on open-sea applications. Therefore, the majority, if not all, commercial products are developed to facilitate open-sea operations. Despite the extensive research in open-sea underwater applications, there exists minimal research on in-pipe acoustic communication systems, where the in-pipe acoustics communications present a bounded communications pathway and power delivery difficulties that are not generally present in an open-sea environment.

There is a need for an in-pipe acoustic communications system, which include deployment of a wireless sensor network inside pipelines, for example. While there has been a significant amount of research done in the area of ocean acoustic communications, these systems are not compatible with pipeline systems. Pipeline systems must account for a number of factors which are not an issue with long range open-sea acoustic communications. For example, in contrast to long range open sea acoustic communications, where attenuation is the primary cause of signal degradation, for in-pipe acoustic applications, reverberation is the most important signal distortion factor. The confined space of the pipeline imposes severe multipath propagation and time spread, as well as phase and frequency dispersion on the propagating wave. Whereas in long range, open-sea communications, ray theory is usually sufficient for the description of the acoustic channel, the simulation of the in-pipe waveguide requires very sophisticated techniques.

Embodiments of the present invention include a system and corresponding method for communicating data in confined waveguides containing a fluid. The fluid may be any form of fluid, such as liquid or vapor. A confined waveguide may be, for example, an oil pipeline, water pipeline or other confined waveguide that carries a fluid.

In one embodiment, a system according to the present invention includes first and second nodes located at first and second locations in the confined waveguide. The first node may include a processor to module data for transmission in the confined waveguide containing the fluid. The first node may also include a transmitter unit including a transmitter to convert the modulated data to a transmission signal and a transducer to convert the transmission signal to a propagation signal to propagate via the fluid in the confined waveguide. The second node may include a receiver unit with a transducer to convert the propagation signal to a received signal and a receiver to convert the received signal to a modulated signal. The second node may also include a second processor, coupled to the receiver unit to demodulate the modulated signal to a data signal.

The propagation signal may be an acoustic signal. Because of spacing between the first and second nodes, the system may include repeaters located at other locations of the confined waveguides to propagate the propagation signals in a manner supporting communications between the first and second nodes. The transmitter unit and receiver unit may include signal processing units to support communications via the fluid in the confined waveguides. The signal processing units may include digital error control encoding, (e.g., Reed-Solomon), and pass filtering, adaptive equalization or other signal processing units to support the communications. The receiver unit may also include a signal preconditioning unit that performs an inverse transfer function or, if multiple transducers are positioned about a cross-section of the confined waveguide, the precondition unit may combine multiple receive signals in a matter enhancing a combined received signal based on a mode classification of the propagation signal at the multiple transducers.

The system may also include power generation subsystems at the first and second nodes. The power generation subsystems may include a turbine, configured to rotate in the presence of fluid flow and a generator coupled to the turbine to generate electrical energy to be used by the respective nodes. The energy generated by the turbine and generator may be less than an order of magnitude greater than an amount needed to operate the respective nodes. In one example embodiment, the system uses approximately 1 Watt of power, and the energy generated may be approximately 1 Watt or less than, say, 10 Watts. The turbine may include at least one blade coupled to and spanning between end structures in an orientation converting fluid flow to rotational energy of the end structures. In one embodiment, the at one blade is rotationally off-set at each end structure. The center of an edge of the at least one blade at each end structure may be closer to a center of the respective end structures than corners of the edge of the blade from the respective centers of the end structures.

The first and second nodes may be positionally separated by single digit meters, tens or hundreds of meters, or kilometers (e.g., 1-10, 10-100, 100-1000) of the confined waveguide. In other cases, the first and second nodes may be located at least one kilometer away from each other at locations of the confined waveguide.

The fluids in the confined waveguides may be liquid or vapor. In one application, the fluid is oil and the confined waveguide is an oil pipeline. The fluid may also be selected from a group consisting of water, gas and air.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An embodiment of an example communications system according to an embodiment of the present invention is based on an exchange of acoustic signals between stationary nodes in a sensor network through a fluid (e.g., water, air, oil, or any other form of liquid or vapor) flowing in a bounded channel, such as a pipe, hereinafter interchangeably used. The pipe may be used as an acoustic waveguide, while in-fluid acoustic transducers both generate and record appropriately formed and modulated acoustic signals to carry data. Once generated, these waves propagate through the fluid inside the pipe and can be detected by a receiver at a remote location in the pipe.

The example communications systems may be used to transmit data, such as raw data, summarized data, or alarm data, as captured or detected by any form of sensor, such as pH sensor, pressure sensor, contamination sensor, and so forth, the communications system may be equipped with a variety of interfaces to receive information from a sensor and then transmit the information to a central location, for example, via a network of in-pipe communications systems.

I. Operational Layout

An example implementation of an acoustic communications system according to an embodiment of the present invention can be separated into two major categories: the software and the hardware. These two levels of implementation are essentially the signal processing and the devices that generate or receive the actual acoustic signal, respectively.

Figure 1:
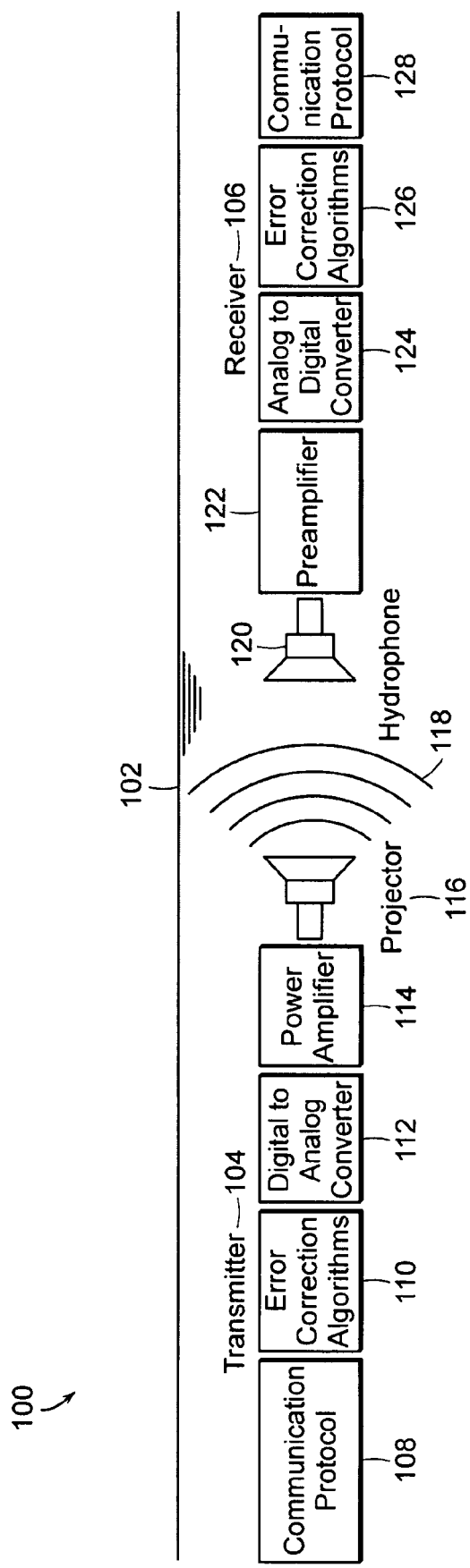
FIG. 1 is a network diagram of a prior art system used in an open-sea environment.
Figure 2:
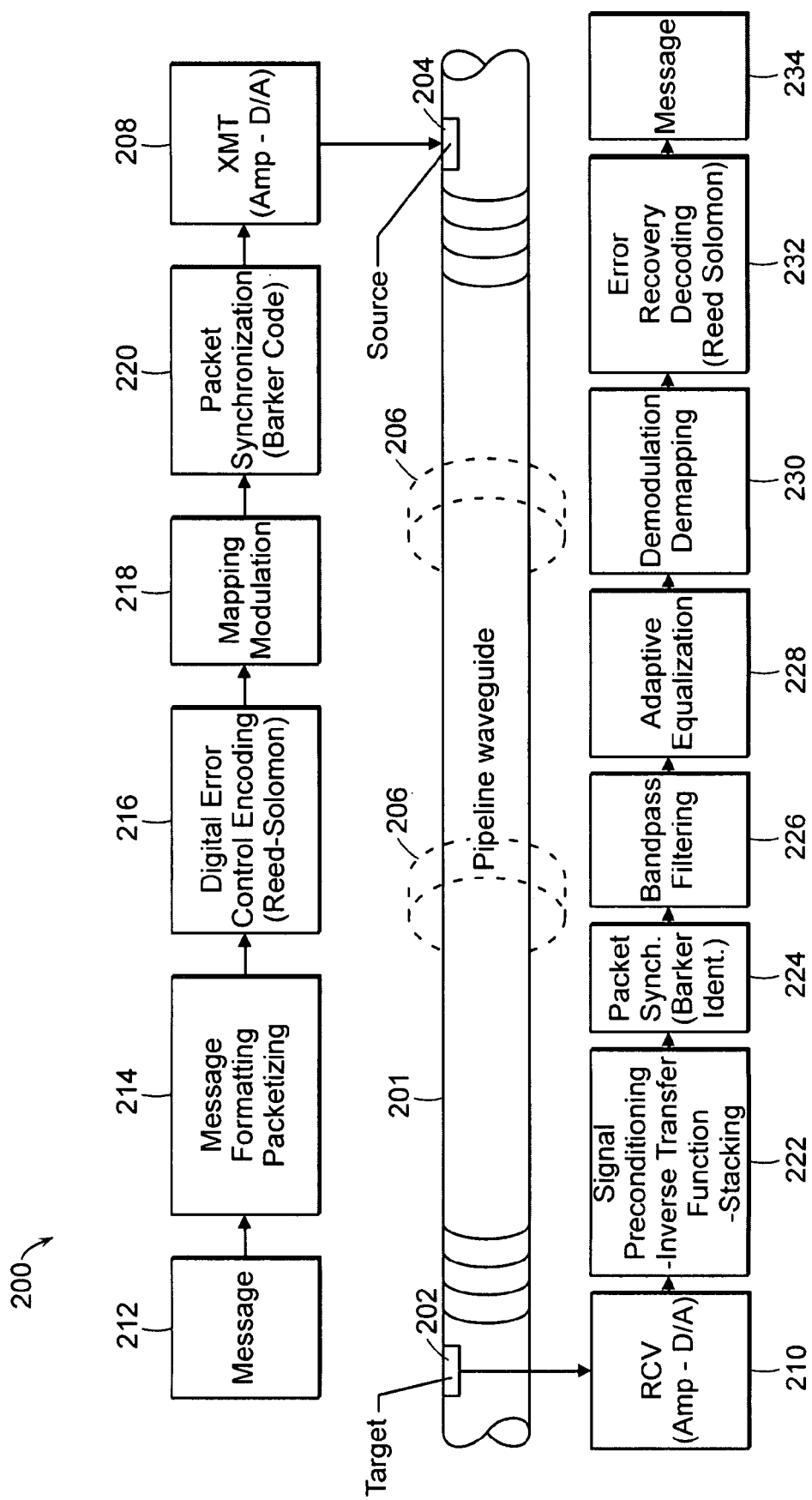
FIG. 2 is a block diagram of a system according to an embodiment of the present invention, communicating via fluid in a confined waveguide.

FIG. 2 depicts an example embodiment of the acoustic communications system and includes example signal processing, which may be used to compensate for potential distortion mechanisms imposed on a propagating signal by the acoustic waveguide. The acoustic pipeline communications system 200 comprises a source 204 and target 202 pair internally mounted in a pipeline 201. The source 204 comprises a transmitter 208 configured to transmit an acoustic data signal to a receiver 210 in the target 202. Relay stations 206 may be placed along the length of the pipeline 201 between the source 204 and target 202 and may be used for relaying the transmitted signal.

A. Software Implementation

1. Message Formatting

The first step in the sequence of processing steps performed at the transmitter 208, is the transformation, or packetizing 214, of the actual message that must be transmitted in a form appropriate for processing. An alphanumeric message 212 is converted into a stream of binary bits with assistance of the 7-bit American Standard Code for Information Interchange (ASCII) code, for example. The implementation of the ASCII code is straightforward, since it replaces each character with a string of seven binary bits.

Following the conversion of the textual message to binary bits, the stream of bits may be separated into standard length packets. The generation of these packets is useful in order to limit the duration of the transmitted waveforms and to format the bit stream into blocks appropriate for the remaining digital signal processing steps.

At this point, the choice of a binary representation of the digital alphabet is implied and should be noted, since it affects the design of the remaining components. The binary representation indicates that the signal symbols in the alphabet can take only two distinct forms, 0 and 1. This selection is preserved across the signal processing, resulting into binary modulation, as described in a later paragraph.

Alternatively, in another example embodiment, the signal can be represented with an alphabet with more than two symbols. However, ambiguity during a detection process among various states of signal transformation increases with increasing number of different symbols. Since only two states exist in a binary representation, the maximum error rate is 50%, which can be achieved even with no information of the incoming data, while the distance between the two representations is maximum, resulting in decreased detection error rates.

2. Encoding

Upon packetizing 214, the data signal may then undergo digital error control encoding 216. Encoding is the process of adding redundant bits to the signal prepared for transmission, which allows the receiver to detect and potentially correct any erroneously received parts of the signal. In practice, the encoder transforms the incoming stream of bits into a predefined set of codewords. Therefore, any variation of the received signal from the prespecified set indicates an error, while correction is achieved by selecting a closely matching codeword. The encoding algorithm used may be Reed Solomon code, due to its powerful attributes for detecting and correcting erroneous bits or streams of bits. The codewords generated by the Reed Solomon code present the maximum available distance among them in the detection space, enabling the algorithm to correct the maximum number of errors that can be achieved for the introduced level of redundancy. The algorithm is guaranteed to correct up to $t=\frac{1}{2}(N-K)$ errors, where N is the length of the code and K is the number of information symbols encoded into a block of N symbols. The length of the code is equal to $N=q-1=2^k-1$, with q the number of symbols in the alphabet and k the information bits mapped into each of the q symbols. For the binary case considered here, k=1 and q=2, corresponding to one bit mapped into each information unit and two being the total number of available symbols, 0 and 1, respectively. The length of the codewords used is N=15, while each one contains K=7 bits of information. Thus the resulting code is capable of correcting $t=\frac{1}{2}(15-7)=4$ incorrectly received bits in each codeword.

Considering the small number of bits present in each packet, this error correcting capability is considered adequate, since each of the ASCII transformed characters is encoded separately. It is important to understand that increasing the redundancy of the encoding algorithm, i.e., increasing the ratio of the length of the codeword over the number of bits represented, results in decreasing the effective bit-rate of the system, since it uses a significant part of the available bandwidth to transmit the redundant bits. The selected codeword length is a trade-off between the error control algorithm capability and the bit-rate performance of the communications system, especially considering the limited available bandwidth of the in-pipe transmission channel. In addition, it is preferable to avoid generating large codewords because large codewords can increase the complexity of the algorithm, consequently requiring more powerful processing units with increased demand in memory and power consumption. It should be appreciated that other encoding algorithms may be employed.

3. Modulation

Upon digital error control encoding 216, the signal may then undergo mapping modulation 218. The combination of mapping and modulation processes is responsible for converting the digital data into a set of waveforms appropriate for transmission into physical media. Most modem digital communications systems execute both operations in the same processing step. According to this step, a block of k binary digits is selected at a time from an information sequence and is represented by one of $M=2^k$ deterministic, finite energy waveforms. Each of these selected blocks represents a specific symbol from the alphabet used. For the digital communications system considered here, there exist only two symbols equal to the bits 0 and 1. Therefore, K=1 bit is the length of each selected block and M=2 are the corresponding waveforms.

When the mapping of the digital sequence to analog waveforms is performed under a constraint that a waveform transmitted at any time interval depends on one or more previously transmitted waveforms, the modulator is said to have memory. On the other hand, when mapping from the sequence to waveforms is performed without any constraint on previously transmitted waveforms, the transmitted waveform depends only on the selected block and the modulator is called memoryless. The communications system implemented utilizes memoryless procedures, due to their immunity to potential carry on errors at the demodulation process. More explicitly, when a modulator has memory, erroneously detected signals at the receiver side may affect the integrity of signals received in the future, resulting in errors at their demodulation process.

In digital communications, the terms demodulation and detection are often used interchangeably, although demodulation emphasizes waveform recovery and detection entails a process of symbol decision. When, in order to demodulate the signal 230, the receiver 210 requires knowledge of an absolute phase of the carrier signal, the process is called coherent detection, whereas, in the opposite case, the process is called non-coherent detection. Coherent receivers preserve copies of all possible arriving waveforms and match them with the incoming signal. However, this process requires estimation of the absolute phase of the received signal, which may potentially lead to errors, especially in dispersive channels, which affect the phase characteristics of the propagating wave. On the other hand, non-coherent detectors do not require knowledge of the absolute phase of the incoming signal, thus reducing the complexity of the receiver and potential phase estimation errors, at the cost of increased error probability for identical signal-to-noise ratio signals. Due to their reduced complexity and elimination of phase estimation, it is desirable is employ non-coherent detectors in the pipeline acoustic communications system. However, some modulation methods, such as phase shift keying and quadrature amplitude modulation, require coherent detection due to superior performance.

Modulation is the process where the amplitude, phase, or frequency of a sinusoidal wave, or a combination of them, is varied in accordance with the information to be transmitted. In digital communications, this variance of the parameters of the signal corresponds to different symbols of the selected alphabet. When only one parameter of the carrier signal is adjusted, amplitude, phase, or frequency, each of the generated symbols corresponds to a different value of the adjustable parameter. Thus, the modulation methods in digital communications are denoted as the name of the adjustable parameter with the ending shift keying, indicating that the method generates the modulated wave by shifting among several predefined keys, i.e., states, of the carrier wave. The widely known nomenclature Amplitude Modulation, Frequency Modulation and so forth, is used for modulation of analog signals.

Due to the binary representation of the signals used in the communication system considered in this thesis, only two values for each adjustable parameter are required for each modulation method. In that respect, the modulation methods examined in this research are the binary Frequency Shift Keying, (FSK), the binary Amplitude Shift Keying, (ASK), or the equivalent binary Phase Shift Keying (PSK), and the Quadrature Amplitude Modulation (QAM). The FSK is used as the method of reference, due to its simplicity and robustness, however, at the cost of low bandwidth efficiency. It should be noted that for QAM, the number of available waveform states is M=4, as a result of the combination of two states for amplitude and two states for phase modulation.

For every modulation method in one example embodiment in one example embodiment, the frequency of the carrier signal is varied from 3 kHz to 63 kHz, with a bandwidth from 2 kHz to 20 kHz, achieving bit rates of 1 kbps to 21 kbps. These values reveal a bandwidth efficiency of 0.5 to 1.05 bps/Hz as calculated by the ratio of the bit rate over the bandwidth used, with the lower value corresponding to FSK and the higher value corresponding to QAM.

Figure 3:
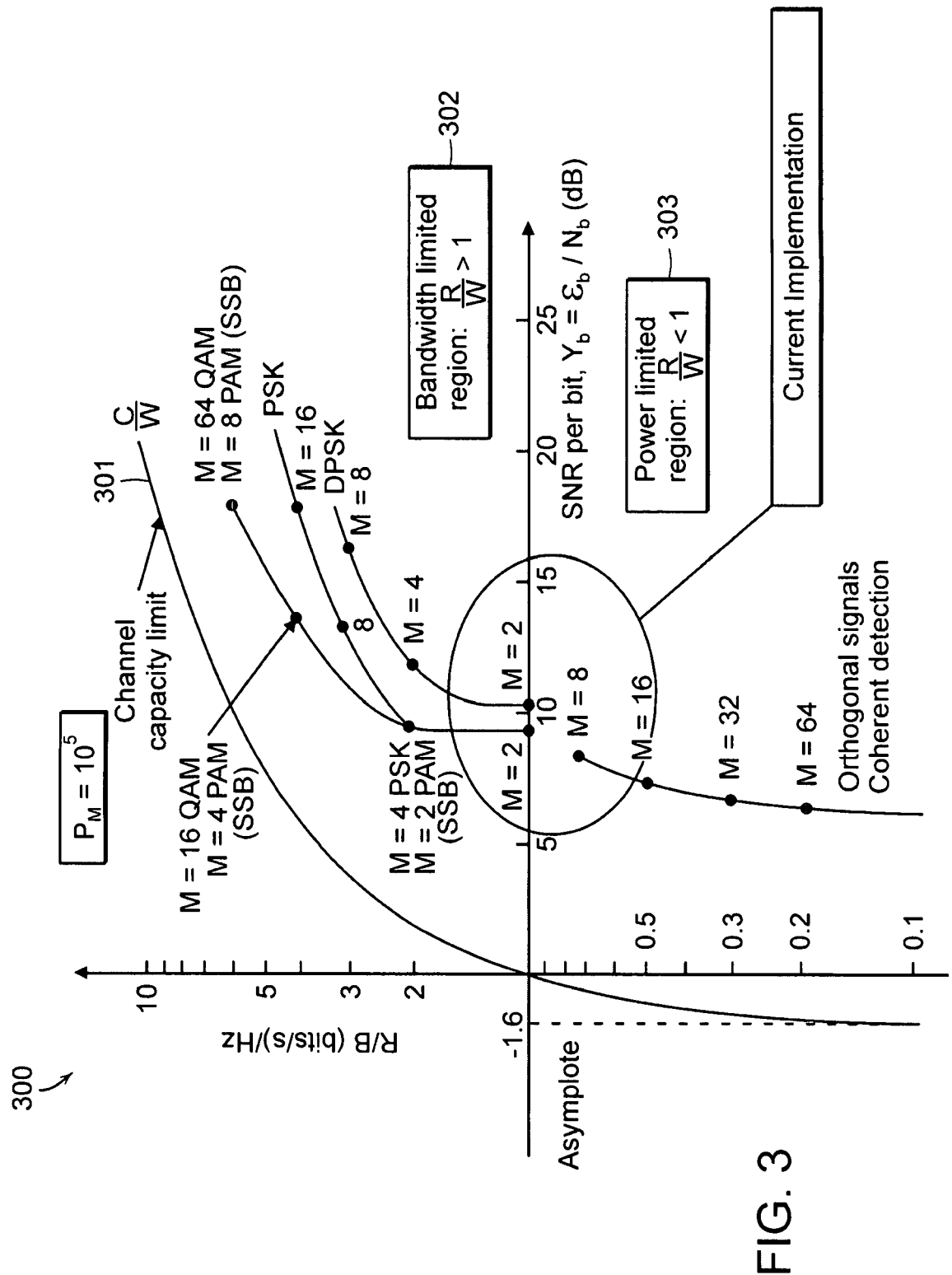
FIG. 3 is a diagram illustrating modulation tradeoffs for use in applying modulation to a signal propagated via the fluid in the confined waveguide of FIG. 2.

FIG. 3 presents a plot 300 the bandwidth efficiency as a function of the signal to noise ratio per information bit for a constant symbol error probability of $10^{-5}$. On this plot, the area that corresponds to the current implementations of the in-pipe digital communication system is indicated.

Three regions can be identified on the plot of FIG. 3. The region on the left of the channel capacity limit curve 301, defined by the Shannon Theorem, is the unattainable region, where the error rate of a system operating in this region cannot be predicted or corrected. On the right of the channel capacity limit curve and above the horizontal axis is the bandwidth limited region 302, and below the axis is the power limited region 303. A system operating in the bandwidth limited region requires excessive amounts of power in order to increase the bandwidth efficiency, whereas a system operating in the power limited region requires excessive amounts of bandwidth in order to lower the required signal power. Therefore, the bandwidth limited region is suitable for bandwidth efficient methods such as PSK and QAM, while the power limited region is suitable for power efficient methods such as FSK with orthogonal signaling. At this point, it is important to realize that in a confined environment, such as the inside of a pipeline, the capacity is significantly reduced with respect to the open sea channels, due to the increased levels of reverberation as well as environmental noise. The trade-off between power and bandwidth for an in-pipe communications system becomes clear at this point, since the channel is bandwidth limited but the application is power limited. Using excessive bandwidth to reduce power is not feasible since it would increase the distortion impact on the signal. On the other hand, it is not possible to increase power to control the bandwidth, since the available power is restricted to that of a potential power harvesting system. This justifies the selection of the modulation to lie near the horizontal axis of FIG. 3, as a compromise between bandwidth and power.

4. Synchronization

Next, in reference again to FIG. 2, the data signal may undergo packet synchronization 220. Phase, frequency and symbol synchronization are inherently included in example embodiments of the system due to the modulation techniques used and the structure of the formatted message. Synchronization is achieved by including a Barker Code before each packet or group of packets prepared for transmission. The Barker code corresponds essentially to a waveform with very good autocorrelation properties. The cross correlation of a signal, which includes a Barker code, with another signal including the same code, results in a distinctive peak, with magnitude equal to the length of the included code, at the time step where the codes coincide, whereas the correlation side-lobes are equal to unity.

Figure 4:
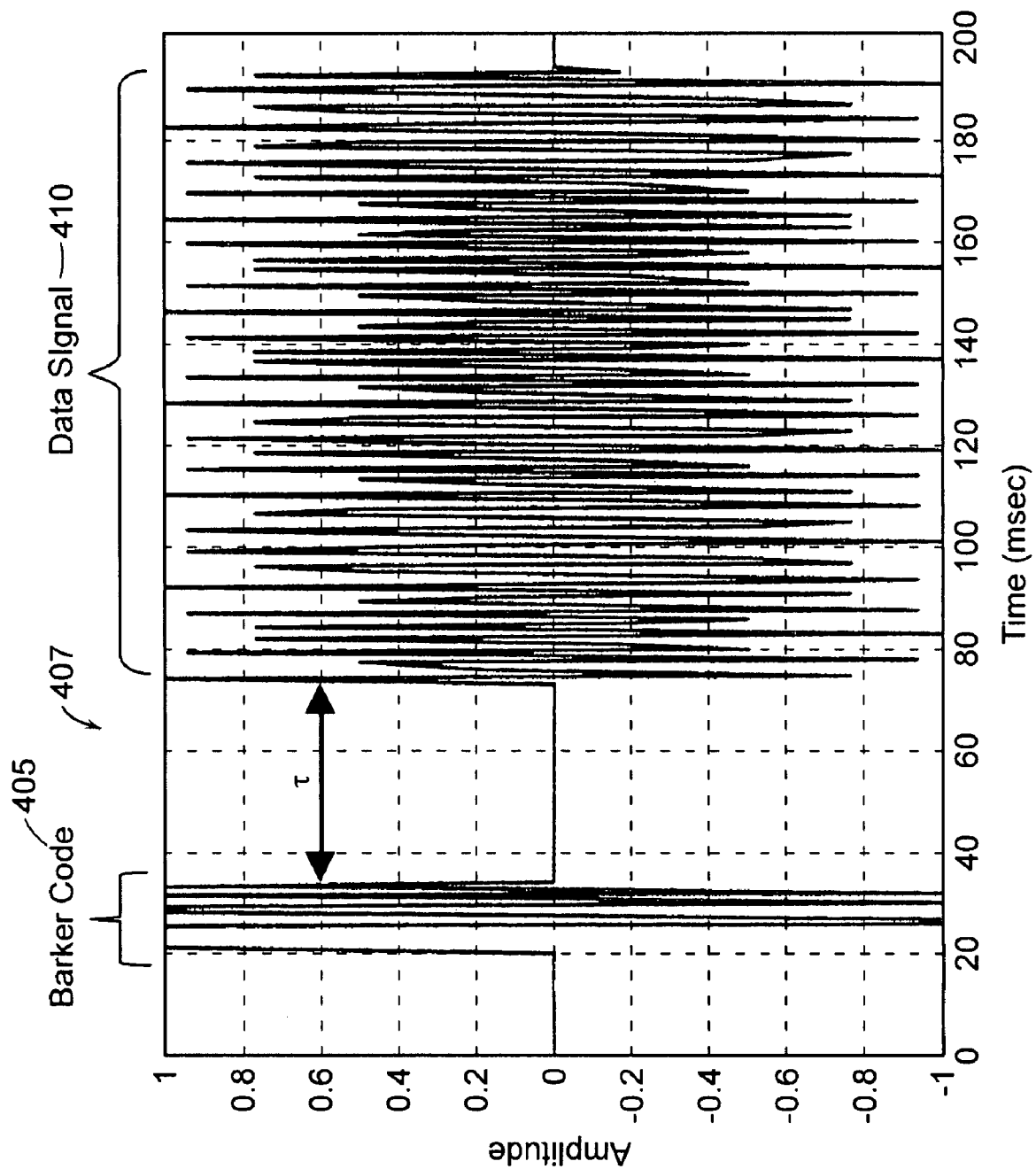
FIG. 4 is a waveform diagram illustrating an example encoded data signal propagated via the fluid in the confined waveguide of FIG. 2.

According to an example embodiment of the present invention, the receiver preserves a copy of the transmitted Barker Code and correlates it with the incoming signal. The highest value of the correlation corresponds to the instant of the Barker Code, allowing the receiver to establish an absolute time stamp. The synchronization code is introduced ahead of the modulated signal, allowing for some prespecified silent time $\tau$ 410 between the code 405 and the signal 410, as illustrated in FIG. 4. The silent time 410 is necessary to allow for the decay of the reverberations introduced by the Barker code and in order to present minimal interaction or overlap with the actual message. Moreover, this time can be used for the calculation of the correlation coefficients, and thus detection of the Barker code time stamp, in order to prepare the receiver for the demodulation of the recorded signal. The information bearing message is the signal received exactly time $\tau$ following the detection of a Barker Code. Unfortunately, there is no constructive method of finding Barker codes, and only 10 of which are known up to a length of 13 bits. This longest available code may be used in embodiments of the communications system, followed by silent time $\tau$ equal to 8-50 msec, depending on the carrier frequency.

Finally, upon synchronization, the data signal 410 may then be transmitted through the fluid pipeline 201 via the transmitter 208. Essentially, the signal processing steps applied at the transmitter 208 are inverted at the receiver 210. The receiver also includes signal processing that attempt to reverse the effect of the pipeline waveguide 201 on the propagating wave.

5. Signal Preconditioning a) Inverse Transfer Function

First, still in reference to FIG. 2, a received signal may undergo signal preconditioning 222. In case the recorded signal is expected to be severely distorted, the preconditioning block is introduced to the receiver in order to prepare the signal for the remaining signal processing. The scope of the preconditioning block is to remove some of the channel imposed distortion and enhance the characteristics of the transmitted signal, even before any other type of filtering or identification of the Barker Code is applied. The signal enhancement is achieved by reversing the effect of the transmission channel by applying an Inverse Transfer Function, or by isolating the less dispersive and/or carrying the majority of the signal's energy modes with Stacking, which is discussed in the next section. These steps may be necessary in regions with significant reverberation and ambient noise, which severely distort the propagating signal; however, they may be computationally intensive or require additional equipment not always available.

Transfer functions are defined as the response of the transmission channel in the frequency domain for an impulse excitation. The multiplication of the frequency spectrum of any signal with the transfer function provides the response of the channel to that particular signal, while transformation back to the time domain provides the time history response.

The main idea of this signal processing is to reverse the effect of the channel on the propagating wave by applying the inverse of the transfer function representing the channel. According to an embodiment of the example method, the transfer function is estimated experimentally by the transmission of a trial signal, a priori known to the receiver. The receiver identifies the transfer function by comparing the recorded signal with the locally stored copy of the transmitted signal, and applies the inverse on every incoming signal to remove the channel distortion. In case the channel has time varying characteristics, retransmission of the same trial signal and re-estimation of the transfer function may be required at appropriate time intervals.

The transfer function can be modeled as a causal Infinite Impulse Response (IIR) filter, the coefficients of which can be found using an Auto-Regressive Moving Average (ARMA) method. Assuming that the output of the transmission channel y[n] for an input signal x[n] can be modeled as:

$$y[n]=x[n]*h[n]+e[n] \qquad (0.1)$$

where h[n] is the transfer function, e[n] corresponds to the additive Gaussian white noise and the operator * denotes convolution. The parameter n indicates the discrete time counter, appropriate for the computational implementation of the algorithm. Ignoring the noise term for the transfer function calculation, in the frequency domain equation (0.1), is written as $$Y(\omega)=X(\omega)\cdot H(\omega) \qquad (0.2)$$

In an infinite impulse response form, the filter $H(\omega)$ can be expressed as $$H(\omega) = \frac{A(\omega)}{B(\omega)} \qquad (0.3)$$

and by substituting in equation (0.2)

$$B(\omega)\cdot Y(\omega)=A(\omega)\cdot X(\omega) \qquad (0.4)$$

where A and B are filters with N and M number of coefficients respectively. Converting equation (0.4) back in the time domain gives $$\sum_{k=0}^{M} b[k]\cdot y[n-k] = \sum_{k=0}^{N} a[k]\cdot x[n-k] \qquad (0.5)$$

with a and b being the coefficients of filters A and B respectively. By selecting b[0]=1, the output of the channel at the time instance n can be expressed as the weighted sum of the previous inputs x and preceding outputs as follows $$y[n] = \sum_{k=0}^{N} a[k]\cdot x[n-k] - \sum_{k=1}^{M} b[k]\cdot y[n-k] \qquad (0.6)$$

This equation corresponds to a set of equations equal to the number of discrete time inputs. Assuming that the channel input x and response y at negative time indexes correspond to zero, the above set of equations is written as $$y[0] = a[0]\cdot x[0] \qquad (0.7)$$
$$y[1] = a[0]\cdot x[1] + a[1]\cdot x[0] - b[1]\cdot y[0]$$
$$y[2] = a[0]\cdot x[2] + a[1]\cdot x[1] + a[2]\cdot x[0] - b[1]\cdot y[1] - b[2]\cdot y[0]$$
$$\vdots$$

This set of equations can be expressed in a convenient matrix form as follows for a total number of L+1 time steps $$\begin{bmatrix} y[0] \\ y[1] \\ \vdots \\ y[L] \end{bmatrix} = \begin{bmatrix} x[0] & 0 & 0 & \cdots & 0 & 0 & 0 & 0 & \cdots & 0 \\ x[1] & x[0] & 0 & \cdots & 0 & -y[0] & 0 & 0 & \cdots & 0 \\ x[2] & x[1] & x[0] & \cdots & 0 & -y[1] & -y[0] & 0 & \cdots & 0 \\ \vdots & \vdots & \vdots & \ddots & \vdots & \vdots & \vdots & \vdots & \ddots & \vdots \\ x[N-1] & x[N-2] & x[N-3] & \cdots & 0 & -y[M-2] & -y[M-3] & -y[M-4] & \cdots & 0 \\ x[N] & x[N-1] & x[N-2] & \cdots & x[0] & -y[M-1] & -y[M-2] & -y[M-3] & \cdots & -y[0] \\ x[N+1] & x[N] & x[N-1] & \cdots & x[1] & -y[M] & -y[M-1] & -y[M-2] & \cdots & -y[1] \\ \vdots & \vdots & \vdots & \ddots & \vdots & \vdots & \vdots & \vdots & \ddots & \vdots \\ x[L] & x[L-1] & x[L-2] & \cdots & x[L-N] & -y[L-1] & -y[L-2] & -y[L-3] & \cdots & -y[L-M] \end{bmatrix} \cdot \begin{bmatrix} a[0] \\ a[1] \\ \vdots \\ a[N] \\ b[1] \\ b[2] \\ \vdots \\ b[M] \end{bmatrix} \qquad (0.8)$$

or more compactly $$y=W\cdot u \qquad (0.9)$$

where y is the ((L+1)×1) vector containing the response of the channel, W is the ((L+1)×(N+M+1)) matrix containing the channel inputs and the preceding response values formatted as shown above, and u is the ((N+M+1)×1) vector containing the coefficients of filters A and B. The system of equations described above is over-determinate, assuming that the used time steps L+1 are more than the number of equations N+M+1. Therefore, there is no unique solution satisfying all equations, and a Least Squares type approach may be employed to identify a sufficient solution. Multiplying with the transpose of matrix W on the left each side of equation (0.9) gives $$W^T\cdot y=W^T\cdot W\cdot u \qquad (0.10)$$

Inversion of the resulting matrix $W^T W$ provides the coefficients of the transfer function $$u=(W^T\cdot W)^{-1}\cdot W^T\cdot y \qquad (0.11)$$

At this point, the importance of the selection of the number of coefficients of the numerator N and denominator M of the transfer function H should be emphasized. At first, it is suggested that N should be larger than M. The values of N and M should be large enough to describe adequately the transmission channel, but not excessive in order to preserve the computational cost at reasonable levels. If computational cost is not an issue, large values for N and M can be selected; however, following the calculation of the transfer function, the coefficients with small values can be ignored, since they most probably attempt to describe the ambient noise of the physical system, which was neglected from the mathematical model presented above. For the stability of the response of the transfer function, it is important to preserve the poles of B and the roots of A inside the unit circle. The accuracy of the solution can also be improved if the initial N, or M whichever is larger, rows of matrix W are eliminated, since they contain zeros that do not contribute to the final solution.

Figure 11:
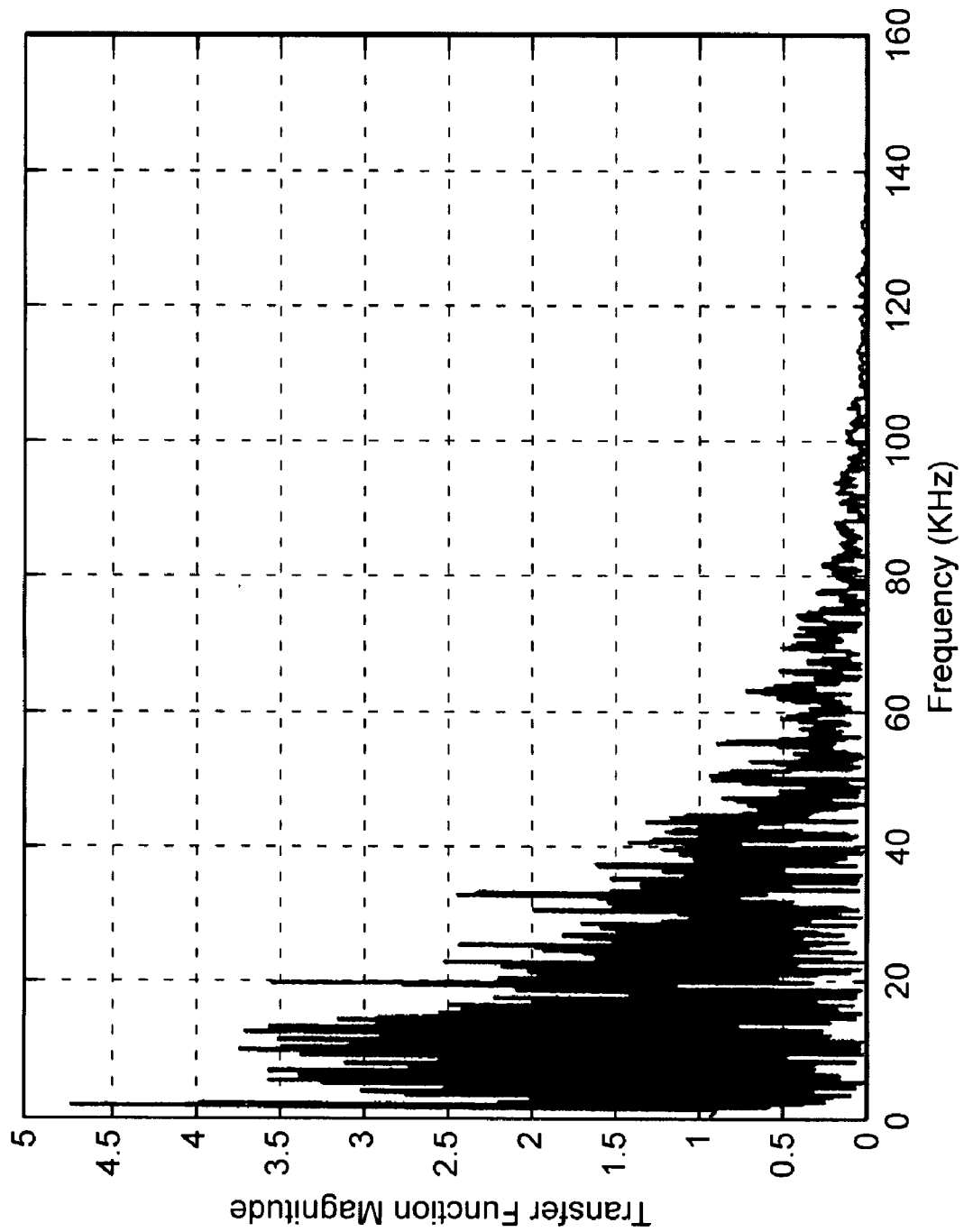
FIG. 11 illustrates the transfer function of a pipeline with radius R=0.5 m, at a distance z=10 m.
Figure 12:
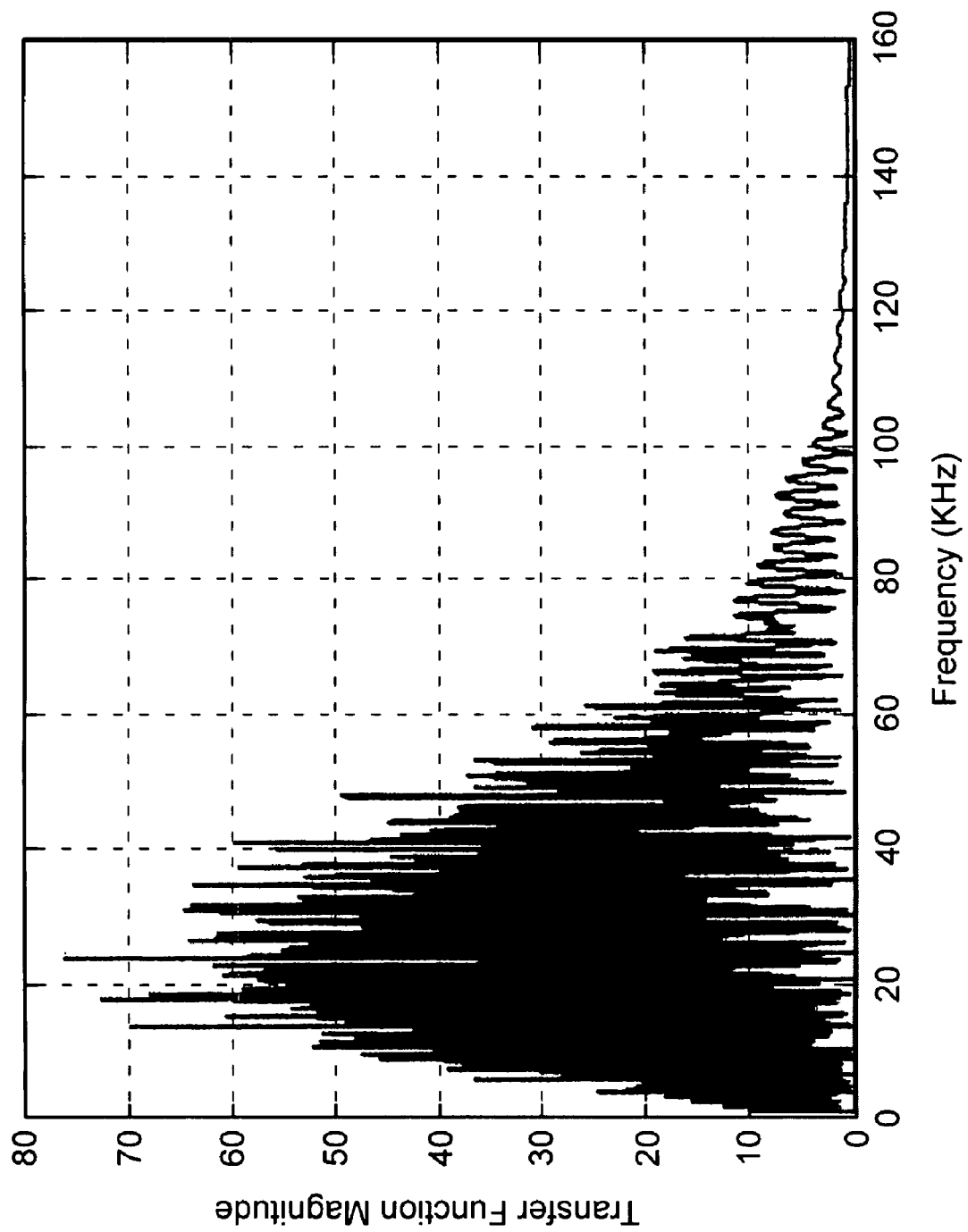
FIG. 12 illustrates the transfer function for a 1 m radius, 10 m long pipeline.

FIG. 11 illustrates the transfer function of a pipeline with radius R=0.5 m, at a distance z=10 m, for a source and receiver located at the axis of the pipe. The decaying, with increasing frequency, shape of the transfer function indicates the lowpass nature of the pipeline channel. Moreover, the dispersive character of the channel is illustrated by the abrupt variations of the transfer function magnitude for adjacent frequencies, as illustrated nicely in FIG. 12 which corresponds to the transfer function for a 1 m radius, 10 m long pipeline.

b) Stacking

Stacking is the second method included in the preconditioning block 222 of FIG. 2. The main idea with stacking is to isolate the orders of modes and preserve the ones that present the minimum dispersion and/or carry the majority of the signals energy. Caution is however required, since there may be cases, especially for high frequency signals, where the modes with low dispersion characteristics do not carry significant part of the signals energy.

In geophysics, the term "stacking" refers to transmission of multiple copies of the same signal, which by superposition reduce the effect of white noise, since it is considered a random process, while at the same time increase the transmitted signal's magnitude. However, reverberation is the main source of signal distortion for the in-pipe acoustic channel, rather than ambient noise, and therefore stacking aims to reduce this effect. For example, embodiments of the system, "stacking" refers to the addition or subtraction of signals simultaneously received at various locations at the pipe cross section to remove the effect of the odd or even modes or isolate any necessary mode.

Figure 5A:
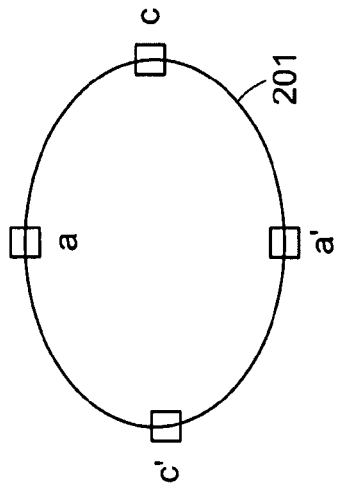
FIG. 5A depicts modes of a signal propagating in the fluid of the confined waveguide at a cross-section of the confined waveguide.

Isolation of different orders of modes is made possible due to the phase changes within the cross section of the pipe, illustrated in FIG. 5A for the first 4 modes 501-504. Odd numbered orders of modes nodes, for example mode 504, present reverse phase sign at opposite locations of the cross section, while even numbered orders of modes, for example modes 501-503, preserve the same phase sign. Therefore, addition of the signals received at positions across a diameter of the pipe results in removing the effect of the odd numbered orders of modes and doubling the effect of the even numbered orders of modes. Alternatively, subtracting those two signals removes the effect of the even numbered orders and doubles the effect of the odd numbered orders of modes. Mode (0,0) 501 represents a plane wave and is therefore homogenous throughout the node and will therefore produce effects similar to that of even numbered ordered nodes.

Figure 5B:
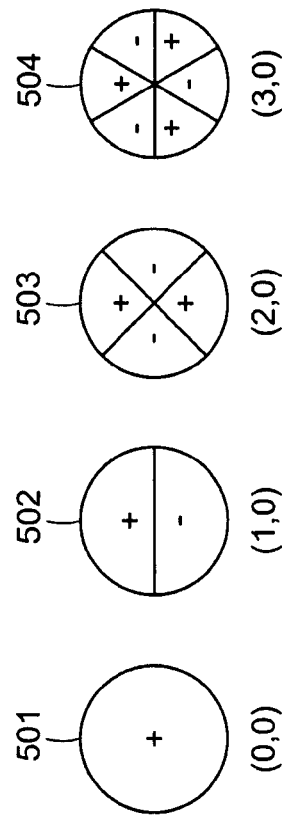
FIG. 5B is a diagram illustrating multiple transducers used by a receiver at a receiving node to apply a stacking technique to enhance a signal based on the modes at the cross-section of the confined waveguide as illustrated by FIG. 5A.

As an example, if a wave comprising a mode (1,0) 502 propagates along the waveguide 201, taking a measurement above and below the waveguide 201 (i.e., detectors a and a' in FIG. 5B) and adding these two measurements, cancels out this waveform, while subtracting the measurements reinforces the waveform.

Further resolution in the isolation process can be achieved with the introduction of additional receivers. For example, if four receivers are installed at the internal periphery of a cross section the pipe at opposing locations separated by 90°, the effect of every fourth order of modes can be isolated (i.e., detectors a, a', c and c'). More explicitly, considering the modes presented in FIG. 5A, summation of the signals from all four receivers results in isolation of the zero numbered order. In such a case, the next appearing order is the fourth, then the eighth, and so on, since summation of each pair of opposite located receivers cancels the odd numbered orders and then the summation of the horizontally and vertically positioned receivers cancels the second, sixth order, and so forth. On the other hand, subtraction of the vertically and horizontally aligned receivers eliminates the zero, fourth, eighth, and so on orders, preserving the second, sixth, and so forth order. By employing additional receivers and with the aforementioned pattern of summations and subtractions of the simultaneously received signals, it is possible to isolate the specific orders of interest, or eliminate modes that severely distort the propagating signal. The main disadvantage of this method is the need to install more than one transducer/receiver pair around the cross section of the pipe, which is not always feasible, or to place transducers at multiple locations around the cross section of the pipe with wiring to a central location with multiple receivers, which may also prove difficult. However, the difficulties in mechanical assembly may be less of a factor than benefit in improved signal quality through mode stacking. It should be appreciated that any order mode may be analyzed via the stacking method and receivers may be placed anywhere along the cross-section of the waveguide, including the center of the waveguide.

6. Bandpass Filtering

The frequency spectrum of the received signal may vary significantly from the corresponding spectrum of the transmitted signal due to channel dispersion, superposition with ambient noise and so on. Aforementioned techniques included in the preconditioning block are capable of reducing the signal distortion, but cannot control the magnitude of environmental noise. This noise is considered to be white, i.e. to have infinite bandwidth. Depending on the magnitude of this noise, its effect may be proven detrimental to the demodulation process, resulting in significant symbol detection errors. The scope of bandpass filtering is to remove the unwanted noise, outside the bandwidth of the transmitted signal. Even though noise within the frequency spectrum of the bandpass filter is still present in the received signal after the filtering process, it does not alter significantly the signature of the waveform, since it corresponds to a small fraction of the total noise energy. It becomes intuitively apparent that narrow bandwidth signals are affected less by white noise, since less noise energy overlaps with the frequency spectrum of the signal. Bandpass filtering is especially beneficial when the FSK modulation method is used, because it limits the frequency spectrum of the received signal to the bandwidth expected by the FSK demodulator.

Careful selection of the bandwidth of the applied filter is useful in order not to annihilate useful data bearing signal along with the white noise. Recall, that the dispersive nature of the transmission channel may result in frequency shifts that may expand the bandwidth of the transmitted waveforms. In the proposed digital communication system, the bandwidth of the bandpass filter used is selected to be several kHz wider than the bandwidth of the transmitted signal, expanding proportionally for higher frequencies. The finite impulse response filter used may be designed by employing a Kaiser Window method, requiring the magnitude of the sidelobes to be at least 50 dB below the signal in the pass band.

7. Adaptive Equalization

Equalization is the process of removing amplitude, phase and frequency distortion from waves propagating in dispersive transmission channels. When the equalizer employs algorithms that automatically adjust their properties to the response of the channel, the process is called adaptive equalization. Adaptive equalizers are required in channels with unknown characteristics, or which present time variability in their properties. In contrast with the inverse transfer function technique, which corresponds to an infinite impulse response filter, that may be used in some embodiments, the adaptive equalizer is essentially a finite impulse response filter with adaptive coefficients. The Linear and the Decision Feedback Equalizers (DFE) have been examined, combined with the Least Mean Squares (LMS) and the Recursive Least Squares (RLS) as the adaptation algorithms. A large variety of adaptive equalizer structures may be implemented, including transversal filters with 5 to 100 taps, or, in other words, delay elements. In general, the DFE requires lower number of taps with respect to the Linear equalizer to achieve the same level of performance, since the DFE benefits from the experience of past data while it removes its effect from the current data. Signals with higher frequency spectra and channels with significant dispersion require larger equalizer structures, since finer resolution is required to describe the channel characteristics. In the current implementations, the step size parameter $\mu$ of the LMS algorithm varies from 0.001 to 0.1 depending on the size of the structure, the characteristics of the channel, and their expected time variability. Larger $\mu$ results in larger steps in the adaptive algorithm, which consequently results in faster convergence to the region of the optimum solution. However, when the algorithm reaches the area of the optimum solution, a large step size parameter may prevent the algorithm from identifying the actual optimum solution. On the other hand, a small $\mu$ results in a slow convergence to the optimal solution, or even worse, may trap the algorithm in the area of a local optimum. For this reason in most simulations a variation of the LMS algorithm is used, which allows to adjust the step size parameters $\mu$ between a high and low value, stating with the high value and decreasing it as it approaches the optimal solution.

The RLS algorithm requires specification of two adjustable parameters; the regularization parameter $\delta$ and the forgetting factor $\lambda$. The regularization parameter $\delta$ is given values between 0.5 and 0.004 with the high values corresponding to signals with low signal to noise ratio (SNR), and the low values corresponding to cases with high SNR. The forgetting factor $\lambda$ is set equal to 0.95 for all adaptive equalizer implementations. The RLS algorithm converges faster than the LMS algorithm to the optimal solution. However, its stability is very sensitive to the selected parameters as well as to the dimensions of the equalizer. In general, the LMS algorithm is more suitable for equalizers with long filters.

B. Hardware Implementation

Figure 6:
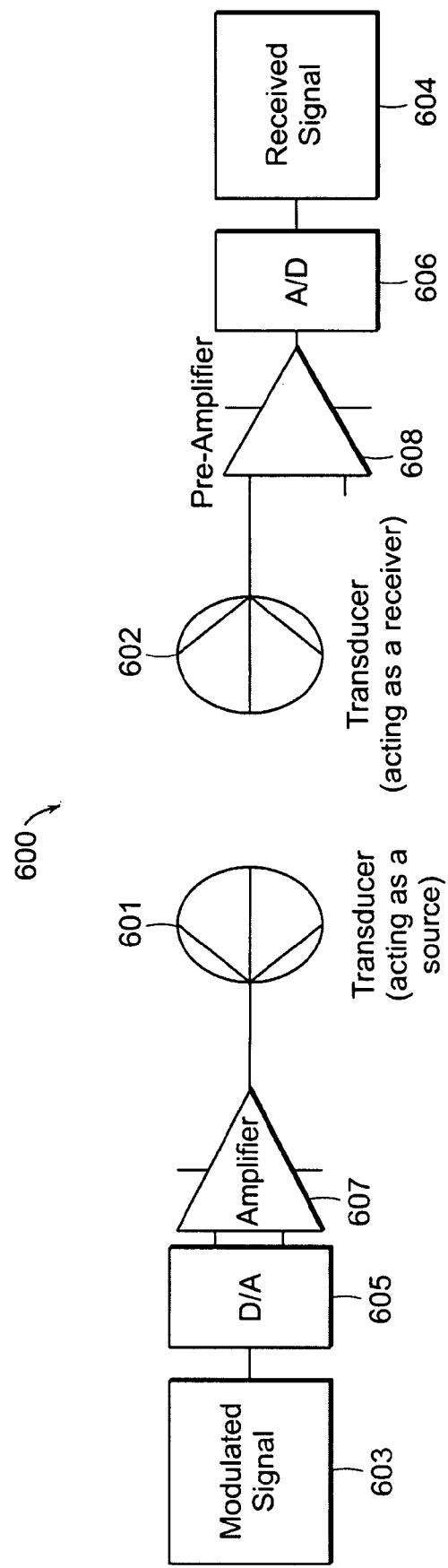
FIG. 6 is a block diagram of nodes in the confined waveguide of FIG. 2.

This section discusses the implementation the hardware components required to realize waveforms and execute the signal processing steps examined in the preceding paragraphs. FIG. 6 illustrates the hardware layout 600 of the transmitter 601 and receiver 602. The blocks labeled modulated signal 603 and received signal 604 represent the integrated circuit processing units that execute all the required software operations for the transmitter 601 and receiver 602 respectively. The system layout 600 also depicts a digital to analog converter 605 included in the transmitter 601 and an analog to digital converted included in the receiver 602. The transmitter 601 also includes an amplifier 607 and the receiver includes a pre-amplifier 608. A powering unit, essential for the operation of every block presented in this figure, is omitted but implied.

1. Microprocessor

All the aforementioned signal processing may be implemented at the software level. The mathematical computations indicated by the software are executed in the proposed communications system by a micro-processing unit. This processing unit may be a programmable microcontroller in which the developed software can be embedded. The selection of the microcontroller may be mainly controlled by the computational demand of the transmission or reception algorithms. In an integrated wireless sensor node, the same processing unit may handle the computational load of the sensor data analysis and event recognition. Increased computational demand is translated in the selection of a more powerful microprocessor, which can handle more instructions per second.

The computational capabilities of the microprocessor are controlled by its architecture and the frequency of its internal oscillator, or in other words, the internal clock. Higher oscillator frequency results into more data packets processed at a specific time frame. However, the increased calculation capabilities are provided at the expense of increased power demand. Since the power resources are limited for the in-pipe communication system, there exists a trade-off between processing time and power consumption. It should be noted that a microprocessor with low oscillator frequency consumes less power per unit time, but it requires more time to execute the prescribed calculations. Therefore, there exists an optimal solution which balances the power consumption and the processing speed, and is heavily dependent on the microprocessor architecture and the amount of required calculations. The selection of the processing unit may also depend on the structure of the software code, and vise versa, indication that the software should be written in such a way to avoid expensive calculations, especially numbers with decimal points and matrix inversions.

In addition to the processing capabilities of the microprocessor, the available memory should also be considered. Memory is required for buffering the data to be processed, or temporary storage for further processing in the future, preserving an event logger, and so on. The trade-off between the power and the processing speed extends to the amount of memory as well, since increasing memory increases the power consumption of the system. Since most microcontrollers have sufficient memory only for the computational load they can handle, memory may be required to include at the circuit board some other form of data storage, such as flash memory chips, in order to preserve data for future processing.

2. Analog to Digital Converter

The signals prepared for transmission by the microprocessor are actually discrete points in time representing analog waveforms. Transmission of the waveform in a physical medium requires a real continuous analog signal. Therefore, the output of the microprocessor is converted from discrete to continuous in time with the assistance of a Digital to Analog Converter (D/A). In turn, at the receiver side, the recorded signal is in the format of a continuous waveform. In order to process and extract the digital data for the incoming signal, it is necessary to convert it into a discrete time form, appropriate to be presented to the microprocessor. This operation is achieved with the assistance of an Analog to Digital Converter (A/D). The selection of these converter units are based on two parameters, namely the resolution and sampling rate. These two parameters are contradictory to each other, since increasing the resolution decreases the sampling rate capability, and vise versa.

The sampling rate is the rate at which the converter is capable of converting the information from one form to the other. The sampling rate capability is controlled by the frequency spectrum of the data bearing signal. In order to convert the signal correctly, the sampling rate of the analog to digital converter is at least twice the highest frequency of the received signal, denoted as the Nyquist frequency. In the same context, the sampling rate of the digital to analog converter is at least equal to the time step of the discrete signal generated at the transmitter microprocessor.

The resolution describes the accuracy with which conversion can be achieved. Higher resolution means that the converter is capable of representing smaller values. Therefore, the resolution of the converter must be high enough to avoid quantization errors, and be able to represent the signal as accurately as possible. However, increasing the resolution of the converter beyond a specific point is not beneficial due to signal magnitude and transducer sensitivity limitations. When the smallest quantity that can be represented by the converter is significantly smaller than the minimum value expected in the data signal, or the sensitivity of the transducer, then the achieved accuracy is not useful, since these small quantities represent the ambient noise or the electrical noise of the transducer.

3. Signal Amplifier

The output of the digital to analog converter is a low power signal frequently normalized to a maximum value of one. Therefore, a power supply is required to provide the power required to drive the signal source. This power supply can be an amplifier, which adjusts the signal magnitude and power to the acoustic source, in order to generate an acoustic signal of sufficient intensity to reach the receiver. This amplifier is composed of either a single, or more frequently a collection of operational amplifiers, with appropriately adjusted gain to amplify the incoming signal.

On the receiver side, an amplifier is used to adjust the unregulated output recorded from the transducer so as to fit the amplitude (or current depending on the transducer) range of the analog to digital converter. Adjusting the range of the incoming signal to the input range of the converter utilizes more efficiently the resolution of the converter. The digitization process, for signals with smaller amplitude range than that of the converter, utilizes only a part of the resolution of the A/D converter. On the other hand, signals beyond the range of the converter are represented by their maximum output value, resulting in significant errors. This amplifier is frequently denoted as pre-amplifier, since it regulates the input signal before any other processing operation.

4. Transducers

Underwater transducers are responsible for converting the acoustic pressure waves into electrical waves, usually in the form of a voltage signal, when they operate as receivers. On the other hand, used as sources of acoustic waves, underwater transducers convert energy provided by a power amplifier into an acoustic pressure output. An underwater transducer with the primary operation to receive acoustic signals is usually denoted as a hydrophone, while when it is used to transmit signals, it is named a projector. The process of selecting an underwater transducer can be a painstaking and toilful procedure, since there exists a large number of parameters that must be specified, the most important of which are summarized next.

The most important attribute of a transducer used for an underwater acoustic communication system is its operating frequency range. Hydrophones have relatively flat receiving response with respect to input signal frequency, enabling them to be used over a large frequency range. On the other hand, projectors tend to have highly variable transmitting response with increasing frequency, limiting significantly the efficient transmitting frequency range for which they can be used. The transmitting frequency response of projectors typically presents a sharp peak at a specific narrow frequency range, and a highly decaying performance for all other frequencies. The operational frequency range of a projector is controlled mainly by its size and structure assembly. It should be understood that the smaller the transducer, the higher its efficient frequency range, due to improved generation of waves with smaller wavelength. The narrow operating frequency range of the projector may impose severe limitations to the bandwidth of the data bearing signal specified by the communications system.

Moderate extension of the projector's operating bandwidth can be achieved, if high voltage power supplies are employed to drive it. This becomes possible since most underwater transducers are manufactured from piezoelectric materials, which can sustain and perform well under high voltage excitations. For this reason, many underwater transducers require high power sources with very high voltages; these are, however, unsuitable for some embodiment of the in-pipe communications system due to limited power supply, as well as environmental concerns due to the presence of high voltage sources.

Aside from the frequency response, a very important property of an underwater transducer is the beam pattern of the waves that it generates. The beam pattern provides an indication of the relative amplitude of the transmitted or received acoustic wave as a function of the direction relative to the transducer. There exist several patterns such as omnidirectional, hemispherical, toroidal, conical, and so on, each one appropriate for a different class of applications.

It becomes apparent that for some embodiments of the in-pipe communication system a narrow beam transducer that transmits along the length of the pipeline is useful. A projector with a highly directional beam pattern allows focusing the energy of the transmitted signal along the axis of the pipeline, reducing consequently the amount of multipath propagation and the energy of the reverberant signals. A highly directional hydrophone, on the other hand, is capable of collecting signals from specific directions, allowing for focusing the energy of the received signal on the direction of the pipeline and hence to avoid multipath received signals. Along with the beam pattern, quantities such as the beam width and the directivity index are preferably specified. The beam width is the angle in degrees of the main lobe, usually defined between the half power points, i.e., where the amplitude has dropped by 3 dB. The directivity index is a measure of the sound intensity of the transducer in the direction of the main lobe compared with the intensity generated from a point, and therefore omnidirectional, source. Unfortunately, high directionality and beam forming frequently requires large in size transducers, which may not be suitable for some applications of the in-pipe communication system.

Successful implementation of some embodiments of the in-pipe communication system may be supported by transmitting and receiving sensitivity of the transducers. A measure of the transmitting sensitivity is given by the Transmitting Voltage Response (TVR), which is calculated as the level of acoustic output referenced to one meter per one volt of input. The receiving sensitivity is provided by the Open Circuit Voltage (OCV), which is the level of electrical output for one micro-Pascal of acoustic input. It is understandable that the higher the sensitivity of the transducer, the more the energy of the acoustic wave it generates. Therefore, a projector with high TVR is useful for some embodiments of the communications system in order to achieve the necessary magnitude of the acoustic wave with lower voltage requirements. In the same context, the sensitivity of the hydrophone must be adequate to resolve the minimum pressure of the data bearing wave that arrives at the receiver. However, excessive receiver sensitivity results in increase of the recorded noise levels, since even the smallest pressure disturbance is recorded and overlapped along with the data signal.

Secondary, but important, considerations include the mounting of the transducer at the internal surface of the pipeline, as well as its size and weight, the materials used, the service life and so forth. The mounting mechanism must provide a stable base in order to allow the efficient transmission and reception of acoustic waves. If the support of the transducer is not stable enough for the frequency range of the signals of interest, the operation of the transducer is not efficient due to its relative motion with the support. The size of the transducer should be small enough to fit inside the pipeline from the insertion point, which may be an access point, a pumping station, and so on. However, recall that the transducer size affects the efficient operating frequency range, with smaller transducers operating at higher frequencies. This size restriction may impose significant limitations on the operation of the communication system, since higher frequency spectrum of the transmitted signal translates into increased reverberation. Special care is required for the materials in order to be safe for introduction inside a portable water pipeline.

5. Power Unit

All the aforementioned operations are feasible under one major, and frequently overlooked, condition: the availability of sufficient power supply. All the devices described above require some amount of power to operate and implement the purpose for which they are employed. The uninterrupted operation of the wireless sensor network, for which this communication system is proposed, requires power sources capable of providing energy for a theoretically infinite amount of time, since the in-pipe installation of these devices prohibits the use of batteries or any other form of power supply that requires replacement at frequent time intervals, due to access limitations. A potential solution for a required renewable energy source is provided from a system that harvests energy from the flow of water inside the pipeline. Such a system was created and is described in a subsequent paragraph.

Figure 7:
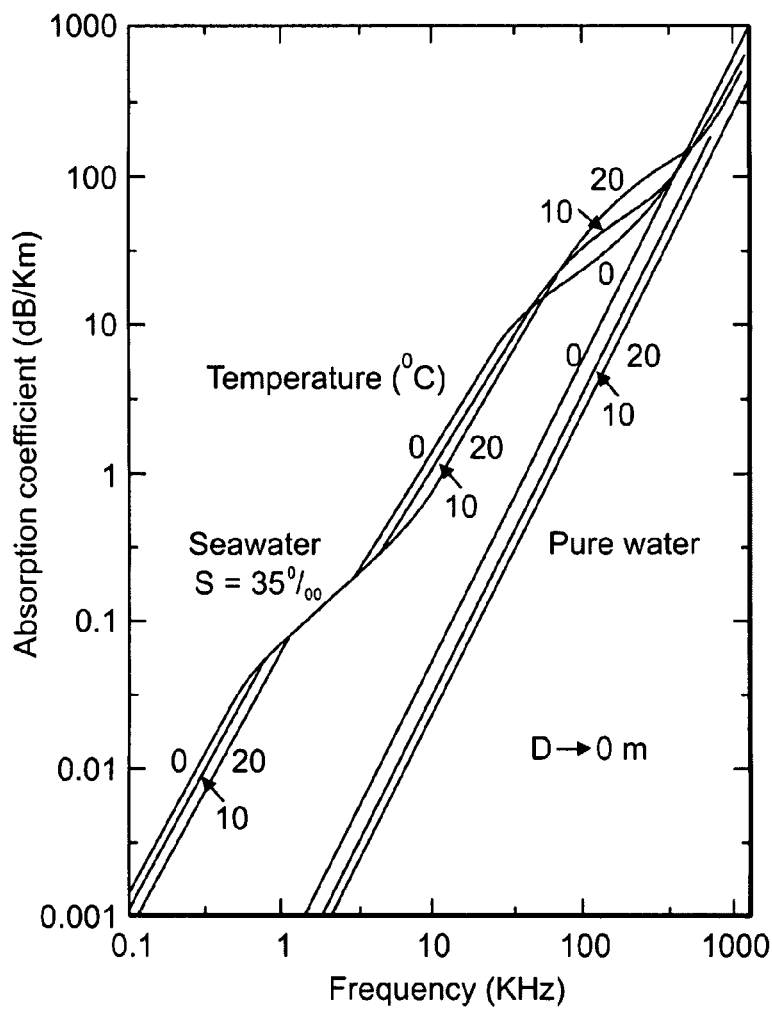
FIG. 7 is a plot of frequency verses absorption coefficient of sea water and pure water in an example confined waveguide of FIG. 2.

First of all, it is necessary to identify the amount of power required for the operation of each wireless sensor node. The largest power consumer in each such node is the amplifier-projector combination of the communication system. The power required by the projector is controlled by the amplitude of the pressure wave used to transmit the data from the source to the receiver. An estimation of the required pressure wave amplitude is provided by calculating the signal attenuation due to spreading and absorption. The resulting amplitude of the wave at the location of the receiver should be at least equal to the minimum detectable pressure by the hydrophone. Considering that the sensitivity of a typical hydrophone, as expressed by the open circuit voltage, is in the order of −180 dB/Volt/mPa, the output of the receiver is 1 nVolt per 1 µPa of pressure. In order to exceed the levels of the ambient noise of the water and the electrical noise of the circuit, the mean value of received pressure level is required to be around 0.5 Pa, which translates to a hydrophone response of 0.5 mVolts. The basic sonar equation relating the sound pressure level $L_p$ at the location of the receiver with the energy of the signal $L_w$ at the location of the transmitter in water is written as $$L_p = L_w + 171 + DI - H \qquad (0.12)$$

where DI is the directivity index and H is the transmission loss. All the quantities are expressed in dB for the default references values for water of 1 m distance, 1 µPa pressure, and 1 Watt of power. If the transmitter and receiver are assumed conservatively to be omnidirectional, the directivity index is equal to zero. The transmission loss is calculated as the addition of the signal attenuation due to spreading and absorption. Even though signal spreading for the in-pipe waveguide matches better the cylindrical pattern, for simplification it is considered here spherical, which provides again conservative results. Thus the transmission loss is expressed as:

$$H = 10 \cdot \log\left(\frac{r^2}{r_{ref}^2}\right) + a \cdot r \qquad (0.13)$$

where r is the propagation distance, $r_{ref}$ is the reference distance for pressure waves in water, which is equal to 1 m, and α is the sound absorption factor for water. The sound absorption factor is a function of the frequency spectrum of the wave as well as several environmental parameters such as temperature, pressure, salinity, and so on. For a water temperature between 10 and 20 degrees Celsius and for an approximately maximum signal frequency of 60 kHz, according to FIG. 7 the absorption factor is equal to 0.4 dB/km. Assuming a propagation distance of 1 km, which is within the objectives of this research, the transmission loss is found to be equal to H=54.4 dB re. 1 m. The only term missing in the above transmission loss equation is the signal attenuation due to fading, i.e., destructive overlap of multipath signals, which however cannot be easily predicted and modeled.

The objective sound pressure level is calculated from the desirable mean pressure of 0.5 Pa as $$L_p = 10\log\left(\frac{P^2}{P_{ref}^2}\right) = 10\log\left(\frac{0.5^2}{(1 \cdot 10^{-6})^2}\right) = 114 \text{ dB } re \text{ } 1\mu\text{Pa} \qquad (0.14)$$

Substituting the above values in equation (0.12) the energy level of the wave at the location of the source is found to be $$L_w = 114 - 171 + 54.4 = -2.6 \text{ dB re 1 Watt} \qquad (0.15)$$

The energy level is expressed in terms of watts as $$L_w = 10\log\left(\frac{W}{W_{ref}}\right) \qquad (0.16)$$

where W is the power in Watts of the wave at the location of the transmitter. Therefore, from equations (0.15) and (0.16) the power of the wave is calculated to be equal to $$W = 0.55 \text{ Watts} \qquad (0.17)$$

It is important to note that the power demand increases exponentially with the input pressure requirement. Therefore, for a required pressure of 1 Pa, the power requirement is in the order of 2 Watts, i.e. four times higher power for two times pressure increase. However, the projector may be configured to operate only when a signal transmission is required. The power calculated above is the power consumed by the projector during signal transmission. Since the duty cycle of the transmitter is usually low, higher power surges may be available from the same energy source, which allows generation of higher amplitude pressure signals.

The power consumption of each of the remaining components of the wireless sensor node, such as sensors, microprocessors, A/D converters, and so forth, lie in the order of mWatts. Summing typical values for the power consumption of each component requires approximately another 0.4 Watts, raising the total power consumption of the system in the order of just less than 1 Watt.

Figure 9C:
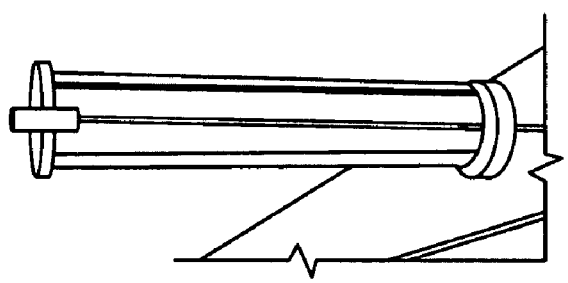
FIG. 9A-C illustrate example turbines that may be used to generate the electrical energy for the nodes of FIG. 2.
Figure 9B:
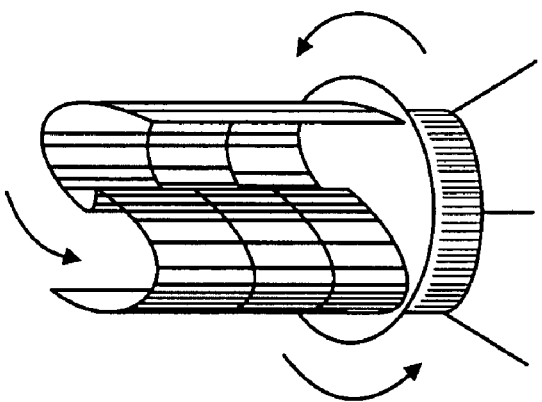
Figure 9A:
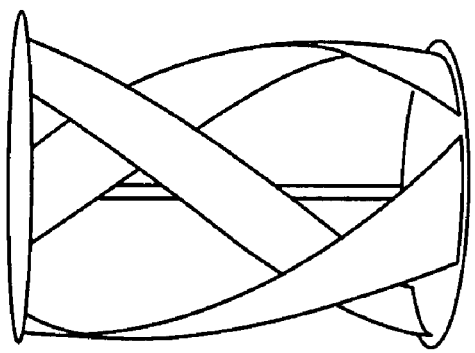

At this point the energy demand has been specified and remains to identify the potential renewable energy source that can satisfy this demand. The most readily available source of energy at the pipeline environment is the flow of water inside the pipe. While the idea of harvesting energy from the flowing water is not new, it has only been applied at very large scale in water turbines used at hydroelectric power plants as well as lower intensity energy sources, such as harvesting energy from tides, waves, and so on. Several attempts for renewable energy have been presented for household use involving, however, large rotating parts and requiring fast flowing streams. Most commercial power generators that use the water flow to extract energy employ a propeller as a turbine. The flowing water causes the propeller to rotate, which in turn is connected to a generator that produces electricity. However, the efficiency of the propeller as a generator is relatively low, in the order of 20%. A very promising energy harvester from tides and waves is the patented Gorlov's Helical Turbine (FIG. 9A), which offers a higher efficiency than regular propellers with a claimed maximum efficiency of 35%. However, the efficiency of this turbine has only been verified for large scale generators, in the order of kW to MW. In general, there is a lack of small scale power generators in the order of 1 watt.

Figure 8:
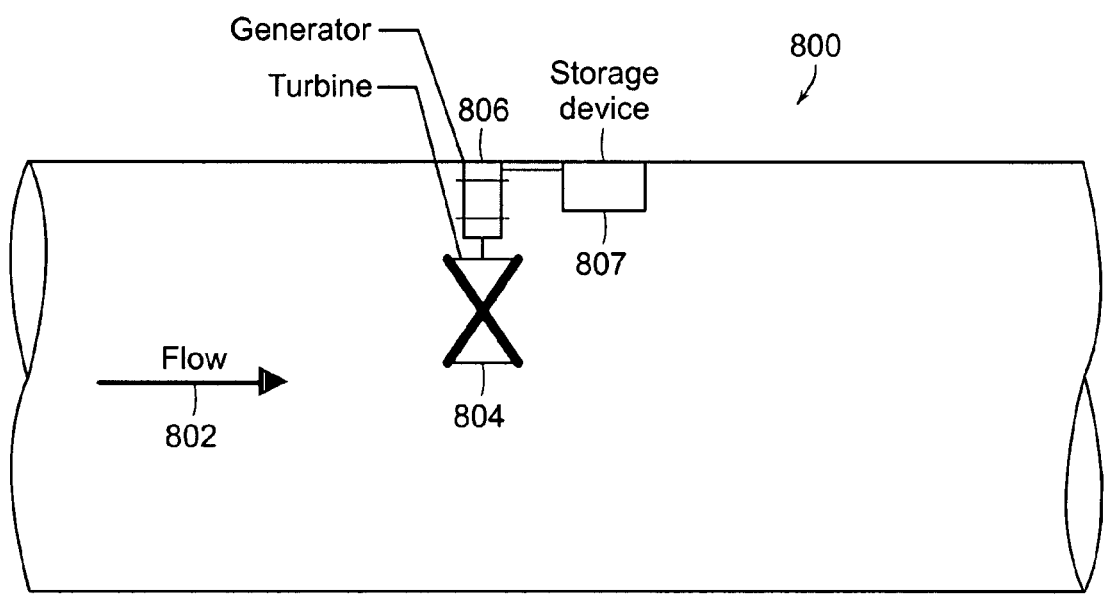
FIG. 8 is a sectional diagram illustrating fluid flow in a confined waveguide and example generators used to provide power to a node according to an example embodiment such as the nodes of FIG. 2.

Accordingly, a power harvesting system 800 according to an embodiment of the present invention extracts energy from the fluid flow 802, with the assistance of a turbine 804, and converts the energy to electrical energy with the use of a generator 806, which may include a propeller 805, as illustrated in FIG. 8. The electrical energy may be stored in a storage device 807, or stored directly.

The capacity of such a system is restricted to the energy potential of the flow. However, the undisturbed operation of the pipeline needs to be considered, and therefore there are technical considerations in certain deployments for making the turbine needs to be as small as possible. The power extracted from a generator can be approximately calculated according to:

$$P = \frac{1}{2}\rho A V^3 \eta \tag{0.18}$$

where P is the power, $\rho$ is the fluid density, A is the area of the turbine perpendicular to the flow, V is the velocity of the water, and $\eta$ is the efficiency of the turbine. The dimensions of the turbine and its corresponding efficiency are the only variables on this equation. Considering that, in one example implementation, the density of the water is 1000 kg/m³, the velocity of the water within a pipeline is often at most in the order of 1 m/sec, the dimensions of a miniature turbine is approximately 10 cm tall by 10 cm wide, and the turbine has an efficiency of at most 35%, the maximum available power that the power harvesting system can generate lies in the order of 1 watt.

Due to the aforementioned reason of using a small turbine, a helical turbine lacks the initial torque to startup easily for slow water velocities. For this reason, within the scope of the turbine aspect of the present invention, a hybrid design (FIG. 9C) that encapsulates the high efficiency of the helical turbine (FIG. 9A) with the high initial startup torque of a Savonius turbine (FIG. 9B) was designed, with dimensions 2" in diameter by 9" tall and capable of generating energy up to 1 Watt for water flow velocity 1 m/sec.

Figure 10:
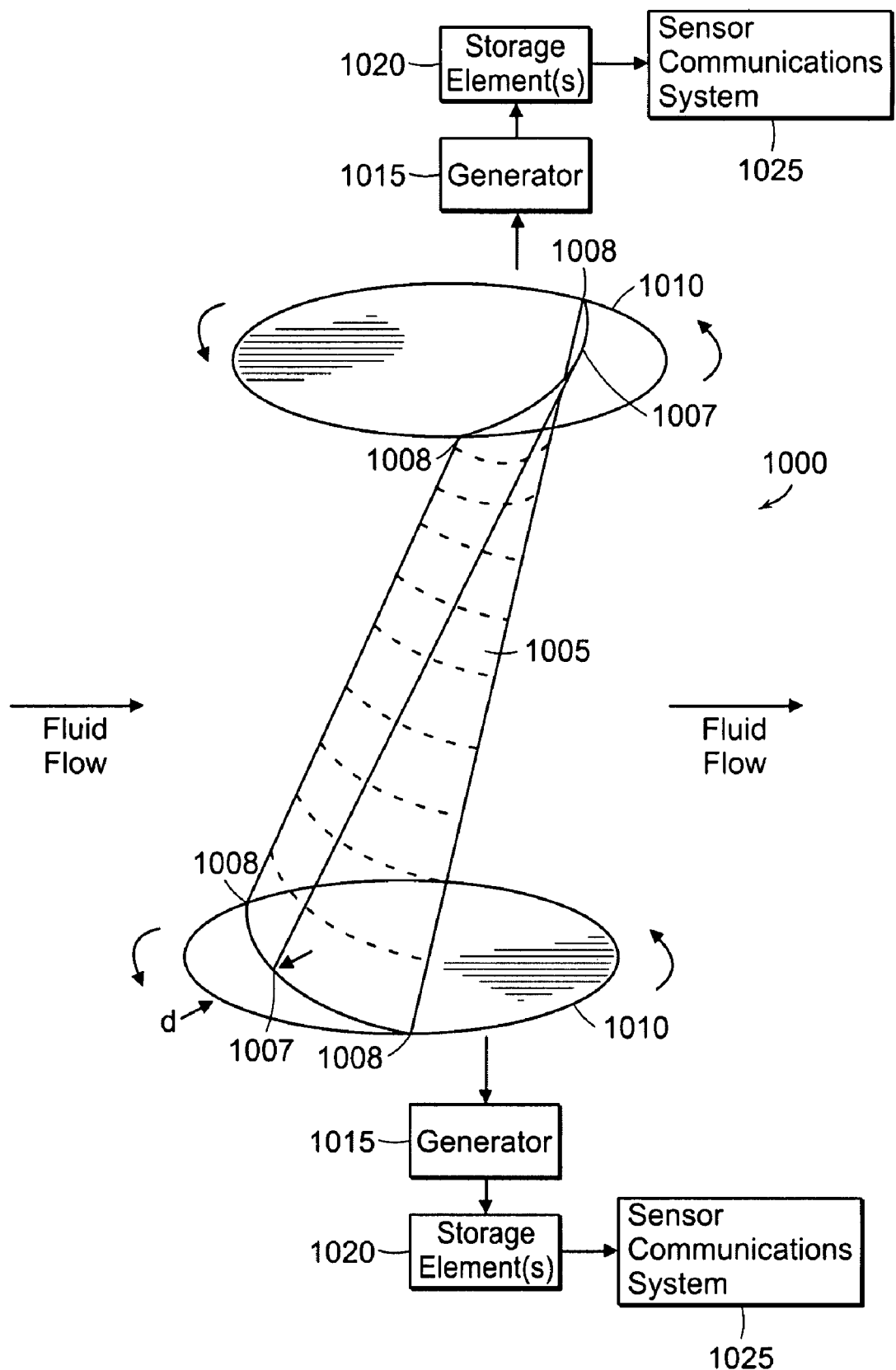
FIG. 10 is a diagram of a turbine of FIG. 9C coupled to electrical generation and storage elements for use in providing electrical energy for a system of FIG. 2.

FIG. 10 is a diagram of a turbines 1000 with at least one blade 1005 according to an example embodiment of the turbine aspect of the invention. The blade(s) 1005 are twisted to span between two end structures 1010 that are coupled to support structure(s) (not shown) supporting rotation, preferably frictionless to the extent possible. The end structures 1010 may define openings to allow fluid to flow past the blade(s) 1005 to cause the blade(s) 1005 to apply a rotational force to the end structures 1010.

The rotating end structures 1010 may be coupled in a contact or non-contact manner to at least one generator 1015 that convert rotational energy of the turbine 1000 to electrical energy, as well known in the art. The generator 1015 may store energy in a storage element(s) 1020 from which the electronics of the sensor communications systems 1025 draw power.

The blade(s) 1005 are attached at both ends 1007 to the end structures 1010 in an offset arrangement. The offset arrangement means that 30°, 60°, and 90°, 135°, or other angular rotation differential is defined by attachment of the blade(s) 1005 to the end structure(s).

The number of blades 1005 can be increased or decreased depending on the width of the blades 1005, diameter of the end structures 1010, offset, curve, and other factors. In one example embodiment, the ends 1007 of the blade(s) 1005 are attached at the corners 1008 to the end structures 1010 at the outer edge embodiments, the ends 1007 may have corners offset inward from the outer edge of the end structures 1010 in which the end structures 1010 have some width toward their centers, such as in cases the end structures 1010 are disks. Through modeling, which is highly complex, or experimentation, the number of blade(s) 1005, size of end structures 1010, curvature of blade(s) 1005, offset angle between attachment points of the blade(s) 1005 on the end structures 1010, and other parameters defining the turbine 1000 can be determined. Also, the curvature of the blade(s) defines a distance d the center of the ends 1007 of the blade(s) 1005 are located from an outer edge of the end structures 1010 in cases the end structures 1010 are circular.

It should be understood that the turbine 1000 may have its blade(s) 1005 and end structures 1010 made of any metal, composite, plastic, or other material(s), with the blade(s) 1005 and end structures 1010 being made of the same or different materials. The material(s) may be selected based on the fluid(s) to which the turbine 1000 is to be exposed, rate of fluid flow, or other relevant factors.

Since the energy requirements of a wireless sensor network, due to processing and transmission of data, as well as the available energy, in terms of water flow, vary over time, an energy storage device may be employed. This storage device can be realized with a rechargeable battery or a capacitor, which will be charged and discharged according to the needs of the system. According to the expected scenario, the power harvesting system will operate at all possible times, i.e. when the water flow is sufficient, and will charge the energy storage device, which in turn continuously supplies power to the sensor node.

While this invention has been particularly shown and described with references to example embodiments thereof, it will be understood by those skilled in the art that various changes in form and details may be made therein without departing from the scope of the invention encompassed by the appended claims.

What is claimed is:

1. A system for communicating data in confined waveguides containing a fluid, the system comprising:
   a first node located at a first location of a confined waveguide, the first node comprising:
      a first processor to modulate data for transmission in the confined waveguide; and
      a transmitter unit including a transmitter to convert the modulated data to a transmission signal and a transducer to convert the transmission signal to a propagation signal to propagate via the fluid in the confined waveguide; and
   a second node located at a second location of the confined waveguide at a given distance away from the first node, the second node comprising:
      a receiver unit including a transducer to convert the propagation signal to a received signal and a receiver to convert the received signal to a modulated signal, the receiver unit including multiple transducers positioned about a cross section of the confined waveguide and further including a signal preconditioning unit to combine multiple received signals from the respective multiple transducer in a manner enhancing a combined received signal based on a mode classification of the propagation signal at the multiple tranducer; and
      a second processor coupled to the receiver unit to demodulate the modulated signal to a data signal.

2. The system according to claim 1, wherein the propagation signal is an acoustic signal.

3. The system according to claim 1, further including at least one repeater node including a receiver and transmitter to strengthen the propagation signal in the confined waveguide between the first node and second node.

4. The system according to claim 1, wherein the transmitter unit includes an encoder to encode the data and the receiver unit includes a decoder to decode the encoded data.

5. The system according to claim 1, wherein the transmitter and receiver units include respective synchronization units applied to respective modulated data.

6. The system according to claim 1, wherein the transmitter unit includes an error control encoding unit and the receiver unit includes an error recovery decoding unit.

7. The system according to claim 1, wherein the receiver unit includes an adaptive equalization unit to remove distortion of the propagation signal caused by transmission from the first node to the second node via the confined waveguide.

8. The system according to claim 1, wherein the receiver unit includes a signal preconditioning unit with an inverse transfer function representative of an inverse of a transfer function of the confined waveguide to remove distortion of the propagation signal as received at the second node.

9. The system according to claim 1, wherein the first and second nodes are at least 3 meters apart from each other.

10. The system according to claim 1, wherein the first and second nodes are at least one kilometer apart from each other.

11. The system according to claim 1, wherein the fluid is a liquid or a vapor.

12. The system according to claim 1, wherein the fluid is oil.

13. The system according to claim 1, wherein the fluid is selected from a group consisting of:
   water, gas, and air.

14. The system according to claim 1, further including a power generation subsystem comprising:
   a turbine configured to rotate in the presence of flow of the fluid; and
   a generator coupled to the turbine configured to generate electrical energy based on rotation of the turbine, the electrical energy to be used by the respective nodes.

15. The system according to claim 14, wherein the energy is less than an order of magnitude greater than an amount needed to operate the respective nodes.

16. The system according to claim 14, wherein the turbine includes at least one blade, coupled to and spanning between end structures in an orientation converting fluid flow to rotational energy of the end structures.

17. The system according to claim 16, wherein the at least one blade is rotationally offset at each end structure.

18. The system according to claim 16, wherein a center of an edge of the at least one blade at each end structure is closer to a center of the respective end structures than corners of the edge of the at least one blade from the respective centers of the end structures.

19. A method for communicating data in confined waveguides containing a fluid, the method comprising:
   modulating data for transmission in the a confined waveguide;
   converting the modulated data to a transmission signal and further converting the transmission signal to a propagation signal;
   propagating the propagation signal via the fluid in the confined waveguide for a given distance;
   receiving the propagation signal and converting the propagating signal to a modulated signal; and
   demodulating the modulated signal to a data signal.

20. The method of claim 19, wherein the propagation signal is an acoustic signal.

21. The method of claim 19, further comprising:
   strengthening the propagation signal in the confined waveguide within the given distance.

22. The method of claim 19, further comprising:
   encoding the data prior to propagating the propagation signal; and
   decoding the encoded data after receiving the propagation signal.

23. The method of claim 19, further comprising:
   synchronizing the modulated data prior to propagating the propagation signal and after receiving the propagation signal.

24. The method of claim 19, further comprising:
   encoding the data prior to propagating the propagation signal; and
   decoding the data after receiving the propagation signal.

25. The method of claim 19, further comprising:
   removing distortion from the propagation signal, with adaptive equalization, after receiving the propagation signal.

26. The method of claim 19, wherein the fluid is a liquid or a vapor.

27. The method of claim 19, wherein the fluid is oil.

28. The method of claim 19, wherein the fluid is selected from a group consisting of:
   water, gas, and air.

29. The method of claim 19, further comprising:
rotating a turbine in the presence of flow of the fluid;
generating electrical energy based on the rotation of the turbine; and
supplying the electrical energy.

30. The method of claim 29, wherein the turbine includes at least one blade, coupled to and spanning between end structures in an orientation converting fluid flow to rotational energy of the end structures.

31. The method of claim 30, further comprising:
rotationally offsetting the at least one blade at each end structure.

32. The method of claim 30, wherein a center of an edge of the at least one blade at each end structure is closer to a center of the respective end structures than corners of the edge of the at least one blade from the respective centers of the end structures.

* * * * *